(12) United States Patent
Chopard et al.

(10) Patent No.: US 11,067,342 B2
(45) Date of Patent: Jul. 20, 2021

(54) METHOD FOR HEAT EXCHANGE AND CONDITIONING OF A HEAT EXCHANGER

(71) Applicant: Hutchinson, Paris (FR)

(72) Inventors: Fabrice Chopard, Saint-Martin-d'Hères (FR); Boris Chauvet, Ferrières (FR)

(73) Assignee: Hutchinson, Paris (FR)

( * ) Notice: Subject to any disclaimer, the term of this patent is extended or adjusted under 35 U.S.C. 154(b) by 222 days.

(21) Appl. No.: 16/308,201

(22) PCT Filed: Jun. 9, 2017

(86) PCT No.: PCT/FR2017/051485
§ 371 (c)(1),
(2) Date: Dec. 7, 2018

(87) PCT Pub. No.: WO2017/212201
PCT Pub. Date: Dec. 14, 2017

(65) Prior Publication Data
US 2019/0186845 A1   Jun. 20, 2019

(30) Foreign Application Priority Data
Jun. 10, 2016  (FR) ...................................... 1655393

(51) Int. Cl.
*F28D 20/02* (2006.01)
*F28D 9/00* (2006.01)
*F28D 20/00* (2006.01)

(52) U.S. Cl.
CPC ......... *F28D 20/021* (2013.01); *F28D 9/0037* (2013.01); *F28D 9/0093* (2013.01); *F28D 2020/0008* (2013.01); *F28D 2020/0013* (2013.01); *Y02E 60/14* (2013.01)

(58) Field of Classification Search
CPC ...... F28D 20/02; F28D 20/021; F28D 9/0031; F28D 9/0037; F28D 9/0093; F28D 2020/0004; F28D 2020/0008; F28D 2020/0013; Y02E 60/14
USPC .......................................................... 165/202
See application file for complete search history.

(56) References Cited

U.S. PATENT DOCUMENTS

| 2010/0223949 A1 | 9/2010 | Higashiyama et al. |
| 2018/0100709 A1* | 4/2018 | Gopal .................... F01M 5/005 |
| 2019/0154358 A1* | 5/2019 | Gopal .................... F01M 5/005 |

FOREIGN PATENT DOCUMENTS

| EP | 0165179 A1 | 12/1985 |
| EP | 2690137 A1 | 1/2014 |
| EP | 2690141 B1 | 10/2017 |
| FR | 3025596 A1 | 3/2016 |
| FR | 3025873 A1 | 3/2016 |
| JP | 2006-226628 A | 8/2006 |
| WO | WO 89/00664 A1 | 1/1989 |

* cited by examiner

*Primary Examiner* — Joel M Attey
(74) *Attorney, Agent, or Firm* — Blank Rome LLP

(57) ABSTRACT

The invention relates to a method for heat exchange. At a first point in time, in a thermal energy storing device, at least part of the previously accumulated thermal energy is discharged to a first fluid by heat exchange, and subsequently, at a second later point in time, when the first fluid has been heated to a temperature higher than the temperature of a second fluid, the second fluid receives heat energy by heat exchange with said first fluid which then circulates on the other side of a first wall that prevents the first and second fluids from mixing.

10 Claims, 9 Drawing Sheets

METHOD FOR HEAT EXCHANGE AND CONDITIONING OF A HEAT EXCHANGER

The present invention relates to the field of thermal management.

Heat exchangers do of course exist in the prior art.

Hence, patent application publications EP165179 and WO1989000664 respectively provide a plate heat exchanger and a tubular heat exchanger.

A problem remains however related to the ability, in the case of circuits in which fluids circulate at different temperatures at different times, in usefully employing this situation for effective thermal management calling for:

avoiding unnecessary loss of the thermal energy that these fluids possess, if only as a result of this temperature difference and/or providing at least one of these fluids with thermal management that brings it to a more appropriate temperature than that/those at which it is currently circulating.

It may in fact be typical that at a given time, a fluid is capable of releasing, or needs to have to release, a thermal energy that a second fluid, or any fluid, or even itself, may subsequently require.

Furthermore, in a turbocharger or a vehicle oil circuit for example, the temperature at which the air in the first case or the oil in the second case circulates at least at certain times when the vehicle is travelling (and therefore its engine is running) is not particularly suitable, particularly in terms of limiting pollutants or fuel consumption.

It is within this context that a method for heat exchange is hereby proposed, wherein:

a) at a first point in time (T1), in a thermal energy storing device, at least part of the thermal energy previously accumulated in a the form of calories is discharged to a first fluid (3) to heat the first fluid by heat exchange, b) subsequently, at a second later point in time (T2), when said first fluid (3) has, during stage a), been heated to a temperature higher than the temperature of a 30 second fluid (5), the second fluid (5) receives heat energy by heat exchange with said first fluid (3) which then circulates on an other side of a first wall (11) that prevents the first and second fluids (3,5) from mixing, It will have been understood that stages a) and b) can be carried out in two successive separate structures: a thermal energy storage/recovery structure followed by a heat exchange structure.

In any event, in order to perform these stages with a performance and within a volume compatible with an application in a vehicle (particularly a car) with a structure that is compact and easy to control thermally, it may be preferred that:

the thermal energy storing device comprising at least one phase-change material (PCM) which, at said first point in time (T1), will contains the at least partly previously accumulated thermal energy which is discharged to the first fluid, and indeed that at said second point in time (T2), the temperature to which the first fluid (3) has been heated being higher than the change-of-state temperature of the PCM material/of at least one of these PCM materials:

said at least one phase-change material (PCM) be loaded with thermal energy via heat exchange with the first fluid in the thermal energystoring device, and that the aforementioned stage b) be subsequently performed.

In particular, two scenarios may furthermore occur.

1. In the first case, it may be desired that, since said first wall is equipped with said PCM material, the first fluid be circulated along the first side and the second fluid along the second side of this wall, simultaneously, from (or at least at) said second point in time (T2).

Such a situation might arise in the case of air and water circulation in a turbocharged engine.

In this connection, in order to implement said method of heat exchange, it will be advantageously executed, in a vehicle, at a crossroads between a first liquid circuit (such as water flowing through another heat exchanger on the vehicle) of the vehicle, as a first fluid and a second air circuit of the vehicle, as a second fluid.

This will usefully combine the functions of a heat exchanger and a thermal energy storing device.

Moreover, when applied to a turbocharger, it may therefore be deemed useful that the second air circuit be a circuit passing through such a turbocharger and subsequently through at least one combustion chamber of the engine with which the vehicle is equipped.

Furthermore, a problem of tempering the air before the turbocharger operates typically arises in this application.

It is therefore proposed that at said first point in time (T1) when the turbocharger is not yet running, the air arriving from said first air circuit and flowing towards the engine combustion chamber(s) be preheated, by performing stage a), via said at least one PCM material, which is then at a temperature higher than its change-of-state temperature.

In addition, it is possible that the thermal benefits associated with air/liquid (water) heat exchange may require refinement at certain times, owing to the temperatures involved and in particular at the outset of engine operation following a prolonged standstill in a cold environment.

It is thus proposed that at said first point in time (T1), the circulation of water from the second water circuit towards the point at which said heat exchange between the air and said PCM material/at least one of the PCM materials be interrupted, so that no heat exchange subsequently exists between the first and second fluids.

On the other hand, it may be useful to provide that stage b) of claim 1 be performed through said first wall equipped with said PCM material at said second point in time (T2) during operation of the turbocharger.

In this exchanger, the heat exchange and thermal energy storage functions will then be combined and the hot air from the turbocharger will be used for more rapid heating of the liquid in the first circuit via the PCM.

2. In a second case and therefore in another application related to powering of the vehicle, it may be desired that, in the thermal energystoring device, said PCM material equipping a second wall that separates, away from the first wall, an inlet flow of the first fluid into several sub-flows, said sub-flows be circulated along this second wall:

during stage a), at a temperature below the change-of-state temperature of said PCM material, during stage b), at a temperature above the temperature of said PCM material.

Hence, this first fluid will be heated at a point in time and will subsequently be able to be cooled while regenerating the PCM.

In this second case, it may furthermore be deemed useful to place the first and second fluids in direct heat exchange, without interposition of PCM.

Thus, it will be possible to take into account thermal management of the oil (transmission oil or gearbox oil) in a case of a circulation with oil/water exchange in particular.

Moreover, it will be possible in particular to perform this on a vehicle equipped with an engine, at a crossroads between a first vehicle circuit containing oil, as the first fluid and a second vehicle circuit containing another liquid having a higher thermal transfer coefficient, such as water, as the second fluid.

In one application, the first oil circuit is a gearbox circuit of the vehicle. An automatic gearbox with a large volume of oil may be preferred. Uses on vehicles driven by an internal combustion engine or by an electric motor or a hybrid engine (internal combustion engine and electric motor) are possible.

Another application could involve the oil designed to lubricate the engine (implying oil other than the gearbox oil; hence elsewhere than in this gearbox).

Thus, it may be deemed useful that at said first point in time (T1):
   c) during stage a), oil designed to lubricate said engine, circulating in said first oil circuit of the vehicle should arrive in the thermal energy storing device at a temperature lower than the change-of-state temperature of said at least one PCM material,
   d) and that there should subsequently be no heat exchange between the first and second fluids, circulation of said other liquid of the second circuit towards said first fluid being subsequently interrupted whereas this other liquid furthermore circulates elsewhere in the engine where it increases in temperature, in heat exchange with (in principle functional) elements of said engine.

In addition, in order to make best use of the heat of the oil after a certain period of engine operation and avoid the oil's excessive heating, it is proposed that after said stage c), stage b) be performed, by establishing circulation of said other liquid from the second circuit towards heat exchange with said first fluid when the temperature of said other liquid in the second circuit is higher than the temperature of the first fluid arriving for said heat exchange.

Furthermore, in order to encourage the efficacy of the exchanges in a typically cramped environment subject to major thermal stresses (volume under the bonnet of a car), it is proposed to carry out a series of stages a) and b) in respective heat exchange stages, different from each other and stacked in succession in one direction.

Another issue addressed was that related to the thermal performance of energy exchanges and storage as well as the output of the installation provided for this purpose.

Hence, a method for conditioning a heat exchanger with thermal energy storage capacity and for carrying out thermal energy exchange therein, characterised in that:
   the aforementioned heat exchange stages are arranged in an insulating jacket comprising insulating walls provided with VIP panels containing at least one thermally insulating material,
   and, in said stages, the aforementioned method for exchange is performed, with all or some of its characteristics.

In addition, in order to ensure optimum use of the thermal energy available during each operation of the engine, it is proposed that said thermal energy previously accumulated by the (at least one) PCM material have been stored during a previous operation of said engine in question of the vehicle, during previous heat exchange with the first fluid which was, at the point and at the time when the previous heat exchange took place, at a temperature higher than the change-of-state temperature of the PCM material/of at least one of said PCM materials.

As soon as the time and operating conditions of this engine have been sufficient for energy to be thus supplied to the PCM(s) and therefore stored by the latter by change of state, this energy can be restored at least partially for a certain time.

A too short time will be of less benefit; a too long time may nullify or excessively reduce the stored energy.

It is therefore advisable to set a time interval of between 3 and 15 hours, preferably between 6 and 12 hours, between said previous operation of the vehicle engine and at least stages a) and b) above.

For all purposes, it is furthermore confirmed that a phase-change material—or PCM—refers to a material capable of changing physical state, between solid and liquid, within a restricted temperature range of between −50° C. and 180° C. The heat transfer (or thermal transfer) can be achieved by using the Latent Heat (LH) thereof: the material can then store or transfer energy by changing state, while keeping a substantially constant temperature, that of the change of state.

As for the term "transversally" or "transverse/transversal", it means a transverse orientation, not necessarily strictly perpendicular, with respect to a reference axis or direction.

The thermally insulating material(s) mentioned below may be a "simple" insulator such as glass wool, but a foam will certainly be preferred, for example polyurethane or polyisocyanurate, or even more favourably a porous or even nano-porous thermally insulating material (which therefore not only includes foams but also fibrous materials, such as glass wool or rock wool) laid out in a vacuum envelope, to define at least one insulating panel, VIP.

"VIP" (vacuum insulating panel) means a "controlled atmosphere" structure, i.e. either filled with a gas having a thermal conductivity lower than that of the ambient air (26 mW/m·K) or "under vacuum", i.e. under a pressure lower than the ambient pressure (therefore $<10^5$ Pa). A pressure between $10^{-2}$ Pa and $10^4$ Pa inside the enclosure may be particularly suitable. The enclosure may contain at least one thermally insulating material that in principle is porous (pore sizes less than 1 micron). In this case, the performance of the thermal management to be ensured will be further improved, or even the overall weight decreased with respect to another insulator. The controlled atmosphere obtained may for example enable a reduction in thermal conductivity to less than about 0.01/0.020 W/m·K under the conditions of use.

BRIEF DESCRIPTION OF THE DRAWINGS

If necessary, the invention will be better understood and other characteristics, details and advantages thereof will become apparent upon reading the following description as a non-exhaustive example with reference to the appended drawings in which.

DETAILED DESCRIPTION OF THE PREFERRED EMBODIMENTS

For the sake of clarity, two privileged cases of application of the solutions proposed here will be presented below, including one split into two sub-cases, its being pointed out however that these are only examples and that the principles in question may apply to other situations.

Let us first study the case of FIGS. 1 to 8, before turning our attention to the case of FIGS. 9 to 17.

Figure 4:
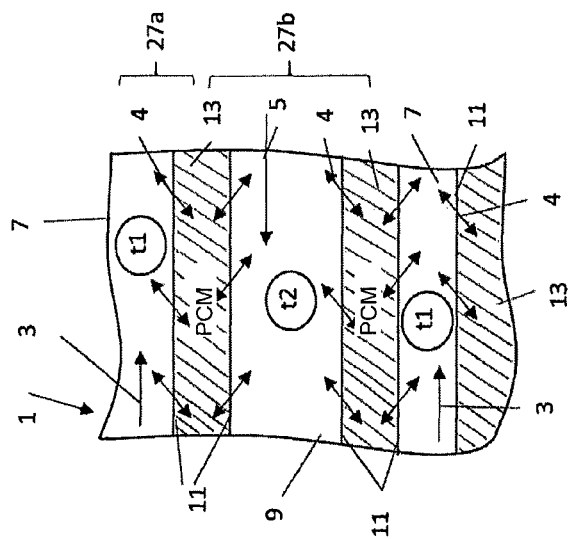
Figure 12:
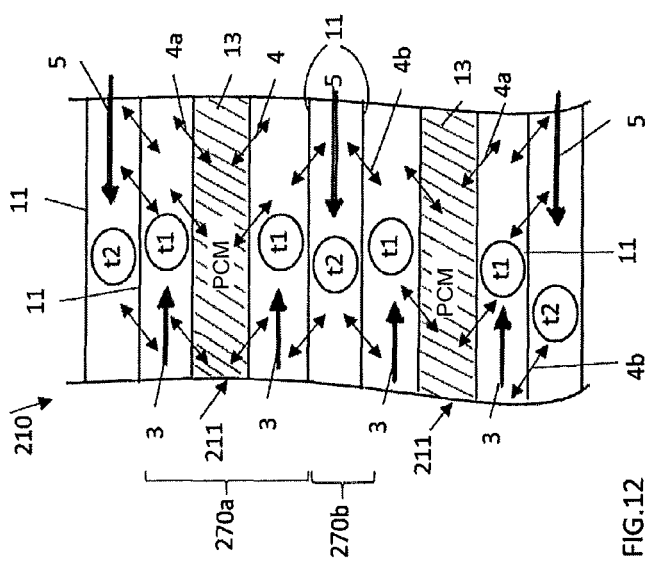

The most complete example common to these cases is shown overall diagrammatically in both FIG. 4 and FIG. 12.

These different cases have indeed the following aspects in common:
  a) at a first point in time (T1), in a thermal energy storing device (marked 260 in FIG. 2 or 9 and marked 1 or 210 in FIGS. 1,4,5,8,10-13), at least part of the previously accumulated thermal energy is discharged to a first fluid 3 by heat exchange,
  b) then, at a second point in time (T2) (see also FIG. 3) subsequent to the first point in time (T1), when said first fluid 3 has been heated to a temperature t1 higher than the temperature t2 of a second fluid 5, this second fluid receives thermal energy by heat exchange with said first fluid which then circulates on the other side of a first wall 11 that prevents the first and second fluids 3,5 from mixing.

In the examples presented here, the thermal energy storing device unit (which is also an exchanger) has internal exchange walls, at least some of which contain at least one PCM material 13. Alternatively, it is possible, although not considered preferable here, to use a device operating based on reversible thermochemical reactions provided for in TCS technology: (CaO/Ca(OH)2; metal oxides—restructuring-; sulphides; see http://energy.gov/sites/prod/files/2014/01/f6/tces_workshop_2013_sattler.pdf).

Hereunder, a single PCM material 13 has been diagrammatically described and is cited. There could of course be several thereof, typically having different change-of-state temperatures (liquid/solid in the non-restrictive examples selected).

Figure 5:
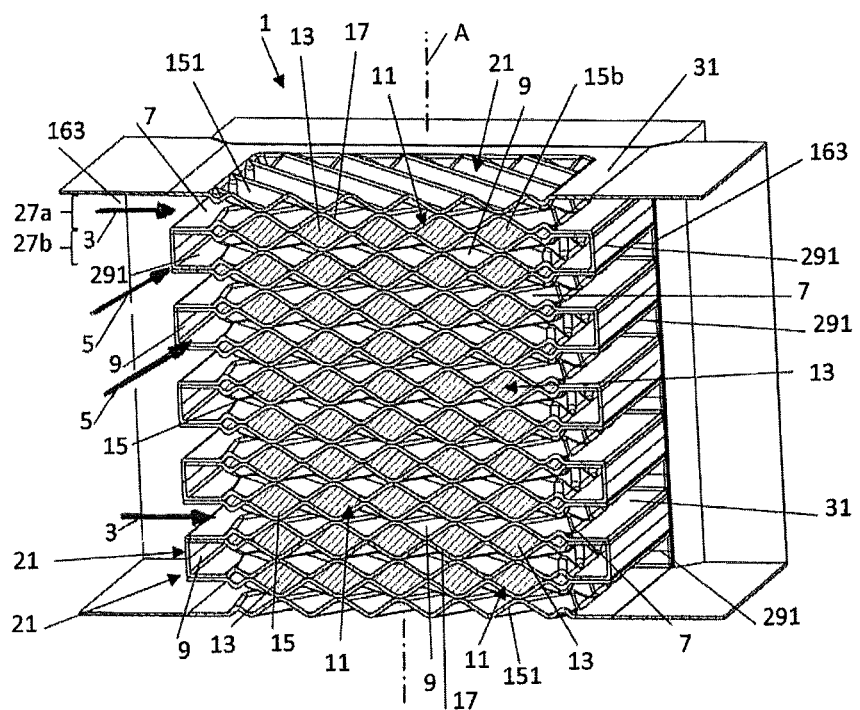
FIGS. 5 and 13 are in contrast diagrams of integrated heat exchangers/stores, also according to the invention, in cutaway views, with FIG. 8 being an exploded view thereof, with arrangement in an insulating jacket, FIGS. 4 and 12 diagrammatically show an operational internal detail of the thermal energy stores/exchangers in FIGS. 5 and 13 respectively.
Figure 13:
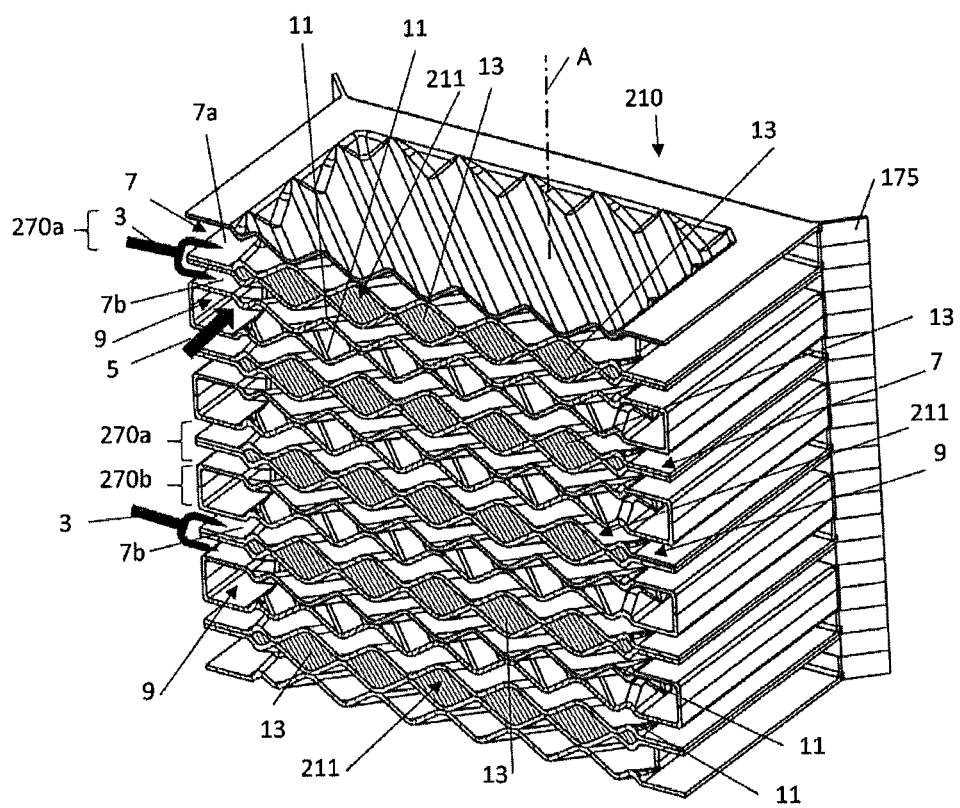

In these FIGS. 4,12, the heat exchanges between first and/or second fluids and/or PCM take place in a single energy exchanger/store, 1 and 210 respectively, of which illustrations are shown in FIGS. 5 and 13, respectively.

Figure 2:
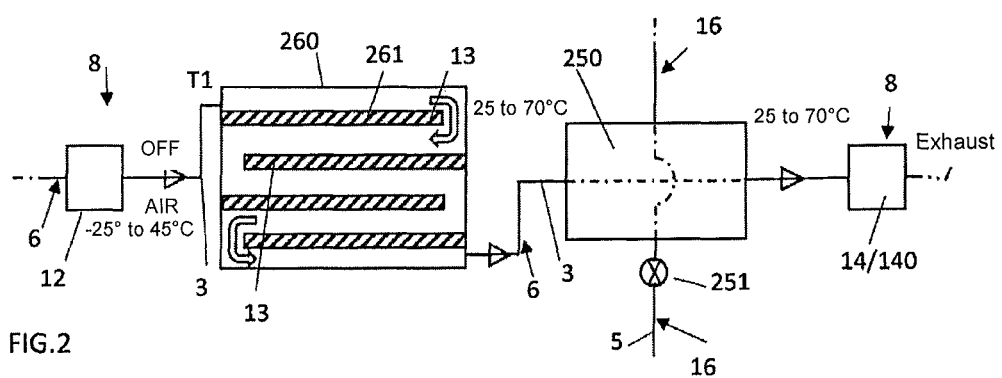
FIGS. 2,3 are diagrams that reiterate part of the circuits in FIG. 1, with a heat store followed by a heat exchanger, independent from each other, as is possible with the invention.

However, the examples shown in FIGS. 2.3 on the one hand and in 9 on the other hand provide for heat exchangers 250 separate from thermal energy storing device 260 and therefore in each case, a point in time T1 for stage a) in the store 260 different from the point in time T2 of stage b) in the exchanger 250, with the first fluid 3 passing through one followed by the other, as shown.

Turning now to the case of FIGS. 1-8, it will be noted that the first step involves thermally managing the air, as the first fluid 3, in an air circuit 6 (FIGS. 1-3), as part of improving the operation of an internal combustion engine 8 of a vehicle equipped with a turbocharger 12 through which the first air circuit 6 passes before the air passes through at least one combustion chamber 14; in this case in a series of cylinders 140 of the engine.

In order to implement the solution recommended above, the heat exchange (for stage b) will be carried out in the exchanger (250) at a crossroads between the first air circuit 6 and a second vehicle circuit 16 through which water circulates as a second fluid 5.

In order to cool the water, the second circuit 16 will advantageously pass through a radiator (or other heat exchanger) 18 of the vehicle. Indeed, the second circuit 16 may typically be the engine cooling circuit that ensures rapid temperature increase of the engine and maintains a fairly constant operating temperature by avoiding engine overheating.

A distinction may be drawn between two operating phases in order to optimise thermal management of the air 3.

Firstly, at the aforementioned first point in time T1 of operation of the engine 8, when the turbocharger 12 is not yet running, air arriving from the first air circuit 6 and flowing to the combustion chamber(s) 14 can be preheated.

This will be achieved by heat exchange between the air 3 and the PCM material 13, which will then be at a temperature higher than its change-of-state temperature, such that it will discharge energy to the air 3.

This is shown diagrammatically in FIG. 4 (stages 27*b* and 27*a* for the part illustrated) within the context of an integrated exchanger/store 1, but could also be performed in the store 260 followed by the air/liquid exchanger 250, as indicated by FIG. 2.

In the store 260, there are one or more elements 261 comprising PCM material(s) 13. A tiered arrangement, with mutually offset stages, of several such elements 261 creating a baffle circulation, for example as shown, would promote energy storage by increasing the air 3/material 13 exchange surface areas.

As already mentioned, the thermal energy available in the PCM 13 will have been at least partially accumulated therein beforehand.

This is where the storage capacity of the PCM material 13 will come into play. Indeed, this thermal energy previously accumulated by this material 13 may have been stored during a previous operation of the engine 8, during previous heat exchange with the first fluid 3 which was, at the point and at the time when this previous heat exchange took place, at a temperature higher than the change-of-state temperature of the PCM material 13.

Figure 3:
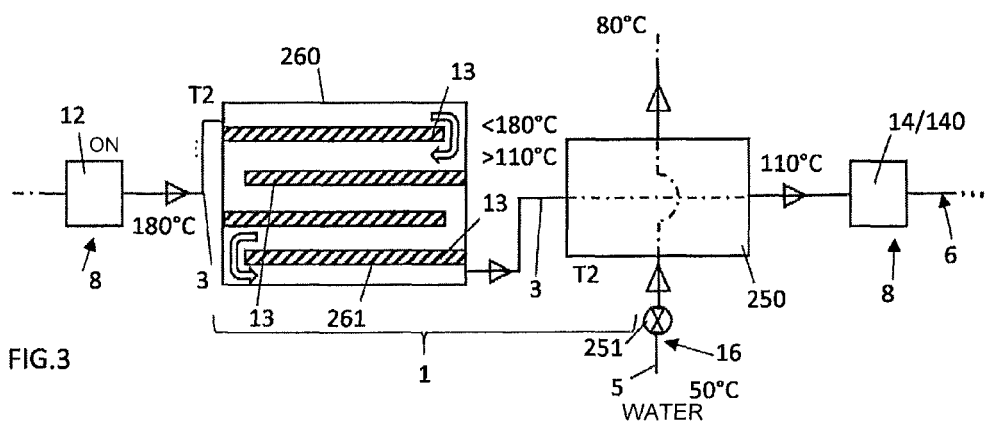

Typically, this "previous moment" can correspond to that of the aforementioned point in time T2 in FIG. 3, with the exception that it will therefore be during a previous operation of the engine 8.

Indeed:
as much at the point in time T1, before the turbocharger 12 starts running, when the engine 8 is cold (having been stopped for several hours for example), the temperature of the air 3 (typically between −25° C. and 45° C.) is below the liquefaction temperature of the PCM 13 (for example on the order of 60-70° C.), as much a few minutes later (at the point in time T2, for example between 3 and 10 min. after starting this engine), launching the turbocharger 12 will bring the air 3 to about 180° C., therefore at a temperature sufficient to (re)liquefy the PCM 13 which may have solidified during the previous stage.

Hence, it will only take a few minutes for the engine 8 to run with its turbocharger 12 launched for the PCM 13 to exceed its liquefaction temperature, i.e. ready for a certain time to heat the fluid 3 (in this case air) at the next engine start. Within this context, it should be noted that good thermal insulation (see in this connection the proposal for the side walls 165 with VIP panels below, in conjunction with FIG. 8) could make it possible to maintain this energy storage for several hours, even if the vehicle is parked in the cold (minus temperature in winter), with the engine 8 stopped, until the next start of this engine.

Figure 8:
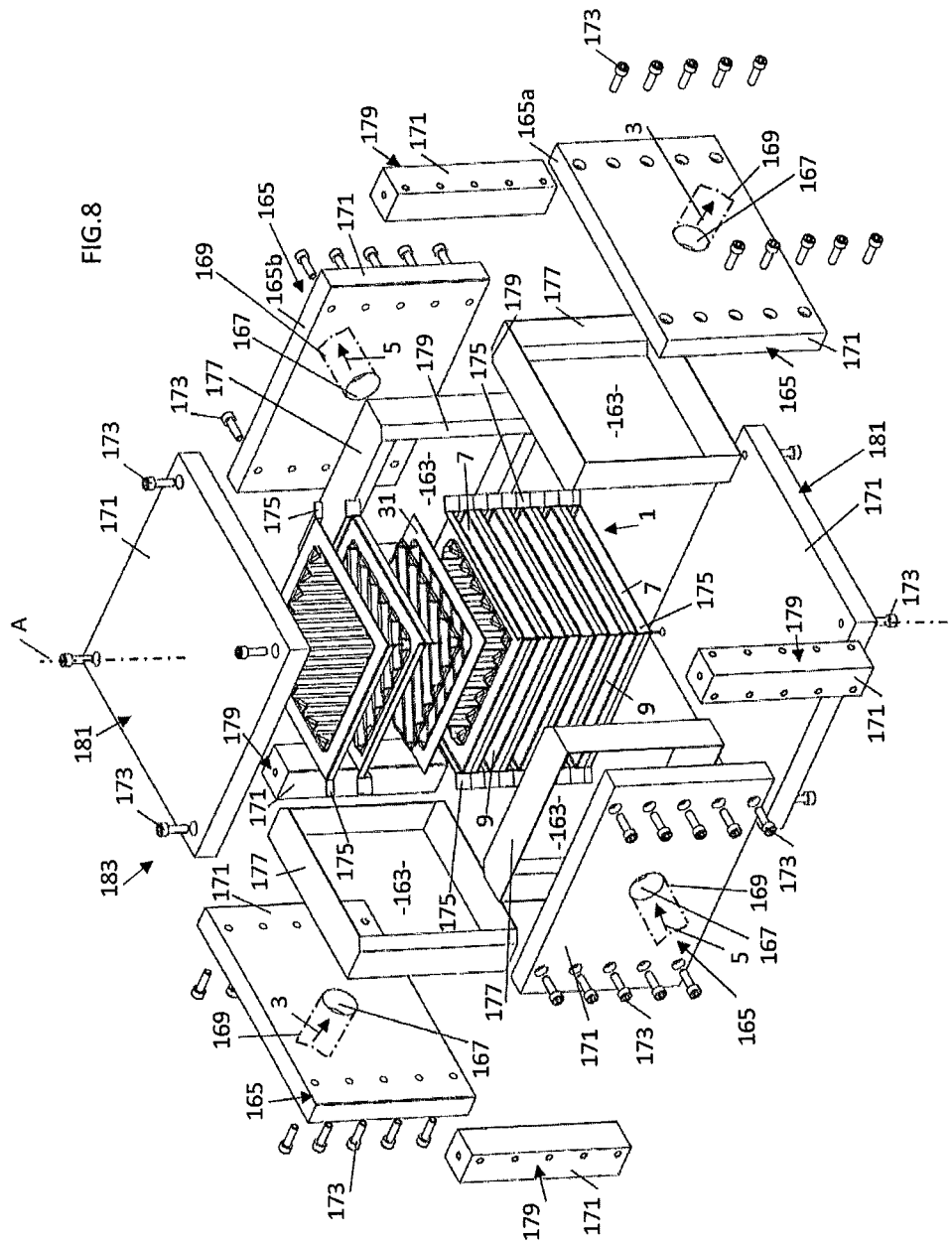

In order to encourage the storage of energy in the material 13 on the one hand and its preservation for several hours, including with the engine 8 stopped on the other hand, it is furthermore recommended here, as FIGS. 4, 5 and 8 jointly show, that:
the solution of an integrated exchanger/store 1 be preferred (rather than the separated versions in FIGS. 2,3),
and such an integrated exchanger/store 1 have a succession of stages such as 27a,27b (at least three in principle and preferably between 3 and 12) arranged in an insulating jacket 183 comprising walls or insulation panels 165,181 containing at least one thermally insulating material 171 and preferably defining VIP panels,
with of course the aforementioned stages (a) and b) of exchange and storage carried out in this integrated exchanger/store.

It should be noted that this will also preferably be the case in the context of the more detailed application of engine oil thermal management below, as shown diagrammatically in FIGS. 12,13 and again in FIG. 8, which applies to all the types of integrated heat exchanger/store concerned here, such as those identified in FIGS. 1 and 210 FIGS. 5.13 (refer to the staggered solution with stages 270a,270b, FIGS. 12.13).

In any case too, at least with such a solution with multiple exchange and storage stages and peripheral thermal insulation provided by thermal insulators 171, it must be possible to establish a time interval for preserving said energy stored in the material(s) 13 of between 3 and 15 hours, preferably between 6 and 12 hours, between said previous operation of the engine 8 and at least the above-mentioned stages a) and b). The use of porous materials (such as aerogels) will be favourable to this.

Returning now to the turbocharger application, it is expected that at least two points in time (T1 and T2) will in particular and in whole or in part be able to benefit from the aforementioned storage and heat exchange characteristics, with the following enhancement options.

Figure 1:
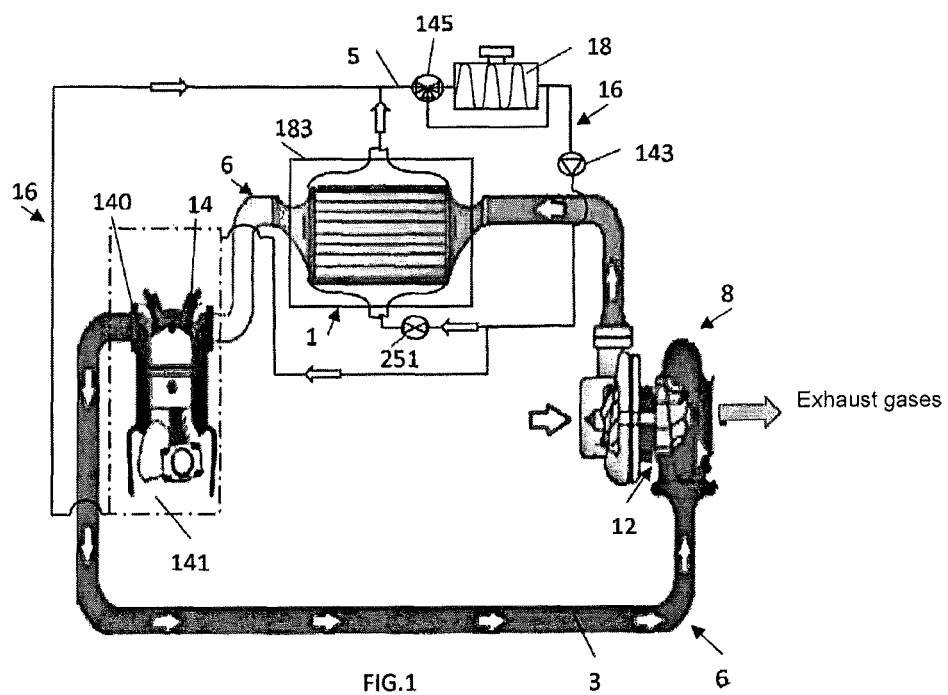
FIG. 1 is a diagram of an application of the invention to a solution that may be of the WCAC (Water-cooled Charge Air Cooler) type in the case of a turbocharged engine.

Firstly, as shown in FIG. 3 in a solution of a store 260 and a exchanger 250 separate from one another (but the integrated solution with an integrated exchanger/store 1 is also concerned; see FIG. 1) it will be possible, at said first point in time (T1), when the turbocharger 12 is not yet running, to therefore preheat air arriving from the first air circuit 6 and flowing to the combustion chamber(s) 14/140 of the engine 8, by carrying out stage a), via said PCM material 13 which is then at a temperature higher than its change-of-state temperature.

Passing therefore from between −25 and 45° C. (Siberian cold or desert heat) to between 25 and 70° C. respectively, for example, this air will be able to supply the combustion chamber(s) 14/140 at a favourable temperature.

In order to prevent this air from losing heat, it is preferable that the possible first/second fluid exchange 3/5 at the crossroads between the first air circuit 6 of the vehicle and the second water circuit 16 does not occur, as shown in FIG. 2 where the valve 251 at the inlet of the exchanger 250 is in this case closed.

Thus, at said first point in time T1, the water circulation from the second circuit 16 to the area defined here by the exchanger 250 or stages such as 27a 27b on the integrated exchanger/store 1 is interrupted, so that there is no heat exchange between the first and second fluids 3,5.

On the other hand, in a second phase, at the point in time T2 of FIG. 3, by opening the valve 251 (FIG. 3) and of course without mixing of the two fluids 3,5, the water circulation from the second circuit 16 towards the heat exchange zone between air and water will be established and the aforementioned stage b) will be carried out, through the wall 11 provided with said PCM material 13 in the case of FIG. 4.

Indeed, with the turbocharger 12 then having started to run, this will have led to an increase in pressure and temperature (to more than 150° C., typically around 180° C.) of the air (of the oxidizer) of the first circuit 6 which therefore serves to supply the cylinders 140.

However, feeding these cylinders at such temperatures is inappropriate: too high thermal stresses, loss of efficiency . . . . Doing so at around 100-130° C. and preferably around 110° C. is desirable.

In addition, since the engine 8 has already been running for a few minutes now, with its circuit 16 therefore active of course, the water (as a cooling liquid for the parts of the engine concerned) will already be relatively hot in the circuit 16, even if its surroundings are cold. Indeed, a well-known engine thermostat 145 for example, closed in this case, will have been able to force the water to circulate solely in the engine, without therefore temporarily circulating in the radiator 18, in the example. This water will have quickly increased in temperature in circulating around the cylinders 140 and in the cylinder head 141 of the engine 8 before returning to the water pump 143 (see FIG. 1).

It is therefore reasonable to consider a rise in water temperature to 40-60° C. at this point in time.

Consequently, this second fluid 5 is at a favourable temperature (50° C. in FIG. 3) at the point in time T2 in order to lower the temperature of the air flowing from the running turbocharger 12, after (solution with a separate store 260 followed by an exchanger 250) or simultaneously with (solution with an integrated exchanger/store solution) a drop in temperature of the turbocharger air, by the energy charge of the PCM 13, since the turbocharger air is at a much higher temperature than the change-of-state temperature of the material 13.

It can furthermore be seen in FIG. 3 that at the point in time T2, the compressed air at the outlet of the turbocharger 12 (for example at an absolute pressure of around 2-2.5 $10^5$ Pa), is at a temperature of 170-190° C., whereas it drops to 110° C. following exchange with the material 13 and subsequently with the water, which can subsequently increase from 50° C. to 80-85° C., thereby simultaneously loading the PCM 13. These favourable temperatures can therefore also be achieved at the outlet of the integrated exchanger/store at the same point in time T2, its being reminded that in this application, any wall 11 which separates the fluids 3,5 is provided with PCM material(s) 13, so that depending on the points in time and temperatures involved between its change-of-state temperature and the temperatures of the fluids 3,5, this/these material(s) undergoes/undergo thermal energy charging or discharging by heat exchange with either of the fluids 3,5.

This is why the double arrows that enter or exit the PCM layer 13 of the wall 11 are marked 4 in FIG. 4 to indicate that with respect to the fluids 3 and 5 flowing on one side or on the other side of each wall 11 respectively, the PCM receives heat from, or yields heat to, one or the other.

Figure 6:
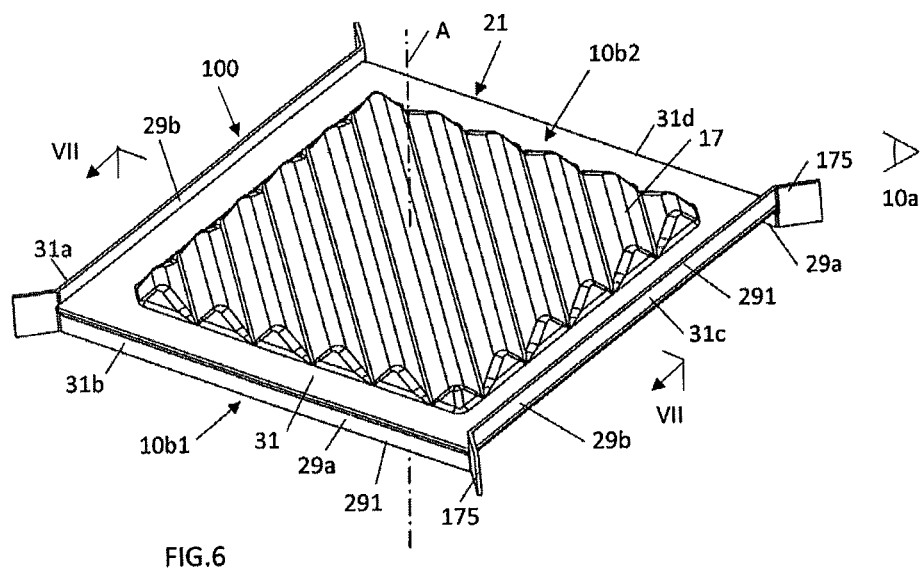
FIGS. 6,7 show views of a generally polygonal plate-shaped element that can define in elevation half a stage of this store/exchanger, FIG. 7 being a section along line VII-VII.
Figure 7:
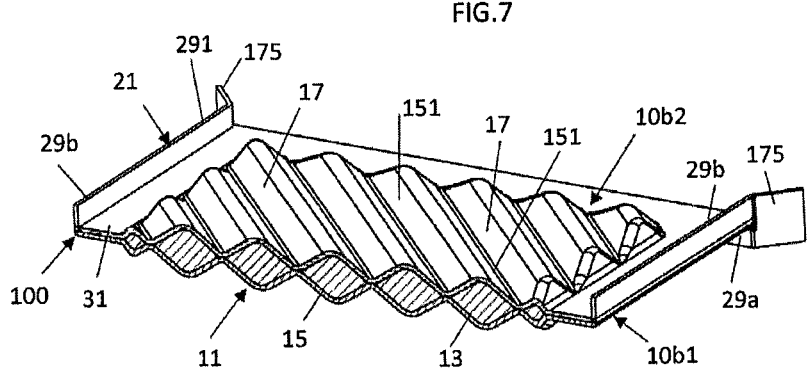

Concerning the embodiment of an integrated exchanger/store 1, FIGS. 5-7 provide an example thereof.

In absolute terms, such an exchanger/store allows an exchange of thermal energy between a first fluid 3 and a second fluid 5, which may be in liquid and/or gas form respectively.

The exchanger 1 comprises:

at least a first free space 7 for the first fluid and at least a second free space 9 for the second fluid, such that these first and second fluids flow in the first and second free spaces, respectively, and at least one thermally conductive wall 11 which separates two adjacent free spaces 7,9 from one another, so that the heat exchange between the fluids 3,5 takes place through the (each) wall 11 concerned.

The wording "at least one . . . free space" indicates that this space can be in the form of one or more volumes.

The wall or each wall 11 is hollow and contains a material 13 for storing thermal energy by accumulating latent heat. This material will thus be in thermal exchange with one and/or the other of the first and second fluids 3,5.

In terms of choice of type of material, a rubber composition as described in EP2690137 or EP2690141 may be used. A material based on paraffin, eutectic (myristic-capric) fatty acid or eutectic hydrated salt (calcium chloride+potassium) could also be used. Alternatively, the material could be based on fatty acid, paraffin, or eutectic or hydrated salt. Other possibilities exist, such as a PCM impregnated in a porous network.

Returning to the structure of the exchanger/store 1, the example in FIGS. 5-7 shows that the wall, or each wall 11 has on either side a succession of hollows 15, inside of which parts such as 13a, 13b of the material 13, and bosses 17 are arranged.

The hollows 15 advantageously face each other, such that individually, the parts of the PCM arranged in these hollows are engaged in two such hollows 15 facing each other.

In order to facilitate easy serial manufacture, an embodiment of the walls 11 with plates 21, as illustrated in FIGS. 6-7 in particular, may prove highly appropriate.

The walls 11 may be produced by moulding, or if they are metallic, by stamping.

A solution involving corrugated plates 21 defining elongated channels 151 forming the hollows 15 will be used to guide the fluid 3 or 5 under consideration in its free circulation space 7 or 9, in for example two general directions transverse to each other at two different stages 27a,27b of the exchanger/store 1.

It will thus be easy to construct a multi-stage exchanger/store 1 from a single type of elementary modules 100.

The heat exchanger 1 may in particular be a plate heat exchanger, so that the first and second fluids flow in the first and second free spaces, respectively, transversely or parallel to each other through the exchanger.

The stages of the exchanger/store 1 will then be stacked in a direction A perpendicular to the general plane 10a of the plates then parallel to each other.

As shown in the example in FIGS. 6, 7, each elementary module 100 may be in the overall shape of a polygonal plate (rectangular in this case) comprising:

a first plate 10b1 having peripherally, on all its edges, margins (or folded edges) 29a,29b alternately in one direction and inversely on two adjacent sides 31a,31b followed by 31c,31d, a second plate 10b2 fixed to the first plate 10b1, engaged between two opposite margins, 29b, of the first plate, and therefore the PCM material 13 interposed between these two plates 10b1,10b2.

In order to fix the first and second plates 10b1,10b2 together, each will advantageously have a continuous flat frame 31 around the hollows 15 and bosses 17 in the centre.

In FIGS. 5,8, it will be noted that with stacking in a direction A of a tiered succession for example of such elements 100:

each derived from assembly of a first plate 10b1, with alternating margins 29a or 29b on all sides (31a,31b, 31c,31d), with a second plate 10b2, and arranged, from one stage 27a to the next 27b, with a relative rotation of 180° about an axis perpendicular to the A axis, it will be possible, as shown in particular in FIG. 5, by fixing together the edges 291 of the folds 29a,29b; 31a,31b, to create a succession of free spaces 7 followed by 9 closed on two opposite sides with, between two successive stages, such as 27a,27b, the honeycombed hollow wall 11 containing PCM.

The fluids 3,5 flow, every second stage, through the free spaces 7,9 in two transverse directions, each perpendicular to the A axis.

Also, a collecting volume 163 per side face is erected around this stack, which in the example shown in FIG. 8 offers six stages of free spaces to the fluid 3 and five stages of free spaces to the fluid 5.

Each collecting volume 163 receives the fluid under consideration, in this case 3 or 5, to be passed through, or having just passed through, the free spaces 7 or 9. Thus, each series of stages of free spaces 7 (respectively 9) is connected upstream (with respect to the direction of circulation of the fluid under consideration) with a first collecting volume 163 and, downstream, with a second collecting volume 163 located on the opposite side face.

Externally, each collecting volume 163 is limited by a side wall 165. Each side wall 165 will preferably be traversed at 167 by an passage thus connecting with a collecting volume 163 to connect to a fluid supply or discharge duct 169.

Moreover, each side wall 165 will preferably contain a thermally insulating material 171.

Between two adjacent side faces, such as 165a, 165b, the collecting volumes 163 are fluidically isolated from each other.

To achieve this, each assembly of first plate 10b1 and second plate 10b2 comprises a projecting lug 175 in each lateral corner (FIGS. 6,7,8 in particular).

For peripheral sealing and therefore insulation between the collecting volumes 163, an interface with the side walls 165 is provided. Rather than a direct engagement with these walls, it is proposed that the axial lines (thus vertical in this case) of lugs 175 fastened to each other engage between two, for example bevelled, vertical corners 179 of intermediate frames 177. The intermediate frames 177 will then be interposed, laterally, between the stack of elements 100 and the opposite side wall 165.

In the lateral corners, pillars 179 stand axially between two adjacent side walls 165, or, as in the example shown, between two adjacent lateral intermediate frames 177, the whole being then covered by the side walls 165.

Fastening means, such as screws 173, may unite the whole, in this case engaged in the side walls 165 and corner pillars 179.

Transversely to the axis A, in this case above and below, solid cover plates 181 are involved in closing, thus preferably sealed and thermally insulated, the collecting volumes 163.

Once the whole is assembled and fastened, we obtain the operational housing 183 forming an exchanger/store 1 including internal circulation of fluids.

Concerning the lugs 175, it is envisaged in one embodiment, as shown in FIGS. 6,7, that they all be formed, by element 100, in a first plate 10b1, taking advantage of the bias extensions (at 45° in principle, as illustrated) created by two adjacent edges alternately folded, such as 29a,29b.

FIG. 13 illustrates an alternative to the solution in FIG. 5, applied specifically to the case of thermal management of an oil circuit (now as the first circuit 6 for the first fluid 3), still on an internal combustion engine 8, with indirect heat exchange with the water circuit (as the second circuit 16 for the second fluid 5), again in the hypothesis of an integrated exchanger/store embodiment (now identified 210).

In this case, the exchanger/store, the outer conditioning housing of which is not shown here (with the collecting volumes 163, the side walls 165 crossed by the supply ducts 169 and covers 181 in FIG. 8), is adapted so that the first free space 7 (stage 270a) is, in the exchanger, divided into at least two sub-ducts 7a,7b through which the (first) fluid 3 can flow at the same time.

A thermally conductive wall 211 extends between the two sub-ducts 7a,7b which contains the PCM material 13.

Thus, the fluid 3 will split within the exchanger into two parallel flows (see arrows in FIG. 13), the PCM 13 material charging itself with or releasing thermal energy, depending on the temperature of the fluid 3.

All the stages of the exchanger 210 could be like the stage 270a mentioned above.

Figure 9:
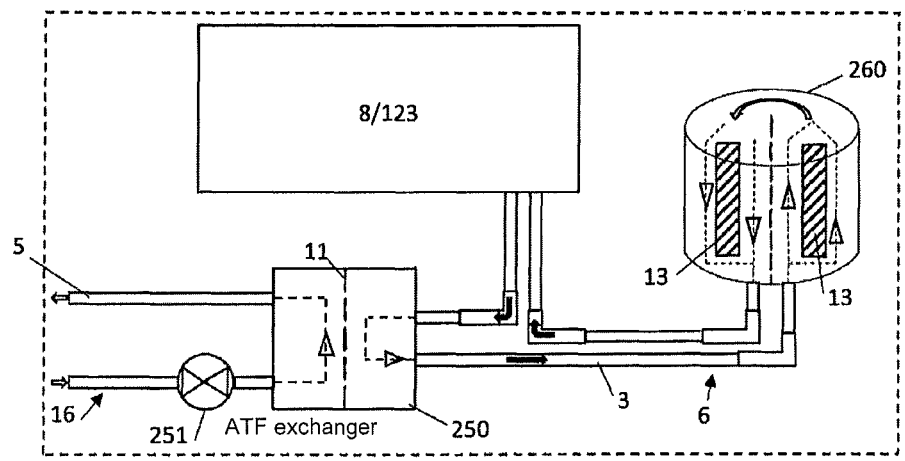
FIG. 9 is a diagram of another application of the invention to a solution that may be of the ATF (automatic transmission fluid) type and a heat store, once again independent from each other.
Figure 10:
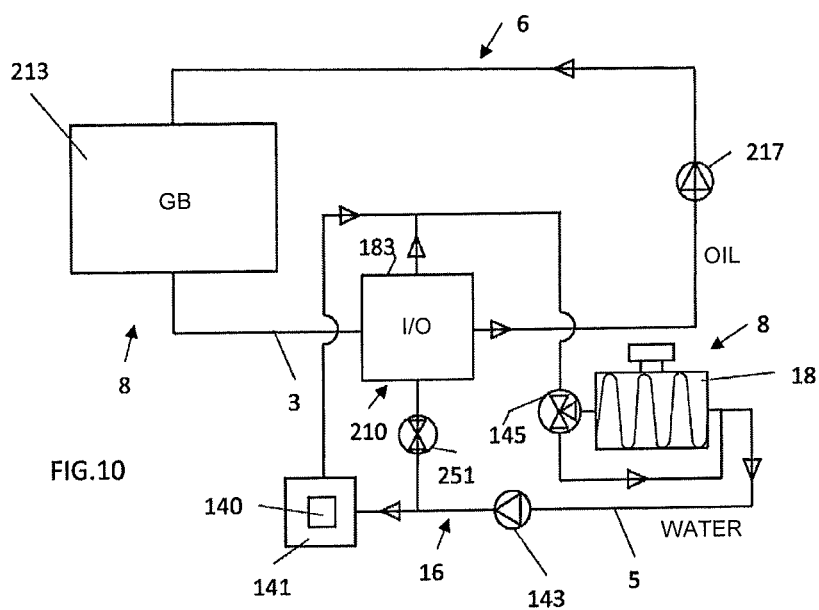
FIGS. 10,11 show two alternative applications of the solutions in FIG. 9 or 13, respectively on an automatic gearbox (GB) and an engine lubrication system (connecting rod and crankshaft bearings, camshaft . . . ), with an oil/water exchanger and a heat store, as well as a structure possibly similar to that in FIG. 13, if an integrated exchanger/store system is preferred, and FIGS. 14-17 each show a perspective view of the manner of executing the exchange or storage elements for the stages of this integrated exchanger/store, with exploded views in FIGS. 15, 17 and assembled sections, along lines XIV-XIV and XVI-XVI, in FIGS. 14 and 16, respectively.
Figure 11:
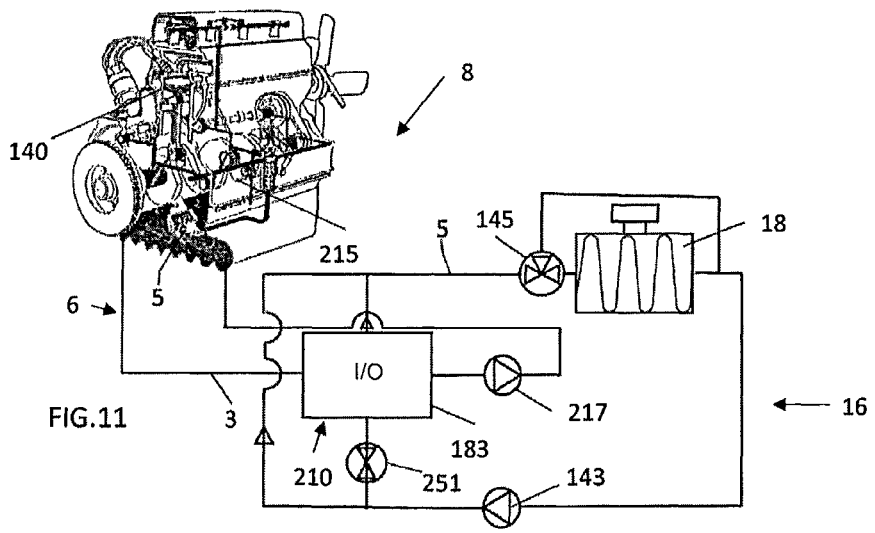

In the aforementioned application of the thermal management of an oil circuit, as shown diagrammatically in FIGS. 9-11, it may however be advantageous for a second fluid 5 to also circulate in the exchanger/store 210, in thermal exchange with the (first) fluid 3 (stage 270b), without mixing these flows and without this second fluid 5 being in thermal exchange with the PCM.

For this purpose, it is proposed that the exchanger/store 210 comprise:
  at least a second free space 9 for the second fluid 5, such that said first and second fluids 3,5 flow in the first and second free spaces, respectively,
  a thermally conductive wall 11, not containing any heat storage material, separating two adjacent first and second free spaces 7,9 from one another, so that the heat exchange between the first and second fluids 3,5 at two adjacent, successive stages, 27a,27b takes place through this "simple" thermally conductive wall 11.

Thus, a PCM material 13 will be interposed between two sub-ducts 7a,7b, through which only the first fluid 3 flows, while this will not be the case between the first and second ducts 7,9, through which the first and second fluids 3,5 respectively flow, without mixing, substantially transversely to each other.

With reference to FIGS. 14-17, a manner of manufacturing the walls 11,211 in FIG. 13 will now be presented.

Figure 14:
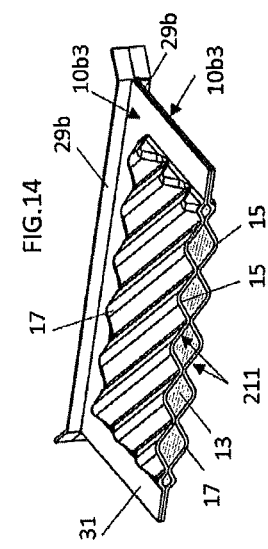
Figure 15:
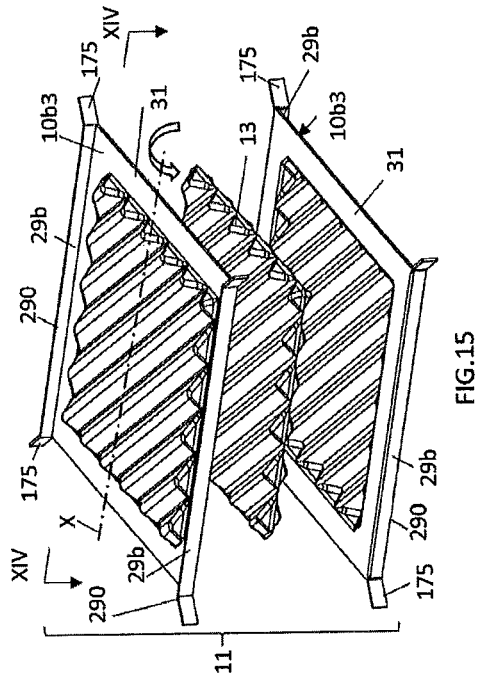

The wall 211 in FIG. 14 is made as shown in FIG. 15, from two identical parallelepipedic plates 10b3, the two opposite edges 29b of which are bent (at right angles) in the same direction.

Both plates are parallel. In the general plane of each plate, the frame 31 surrounds the central portion with hollows 15 and bosses 17, again in the form of parallel waves at an angle, in the manner of a corrugated sheet.

The material 13 is interposed in the hollows 15 between the two plates 10b3.

For assembly, one of the two plates is rotated through 180° in relation to the other, about the X axis passing through the two opposite unfolded edges, with the edges 29b being back to back. They are subsequently assembled in an airtight manner (typically by welding), by their frames 31 pressed against each other, following interposition of the material 13, so as to obtain the double wall 11 in FIG. 11.

Figure 16:
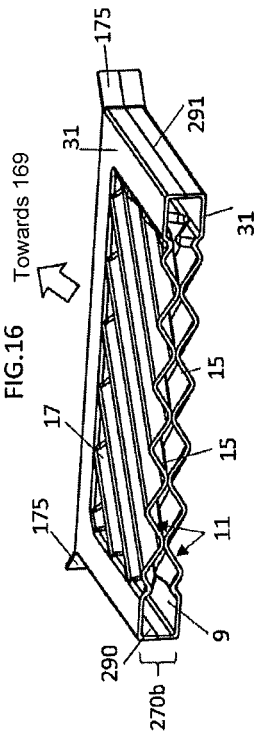
Figure 17:
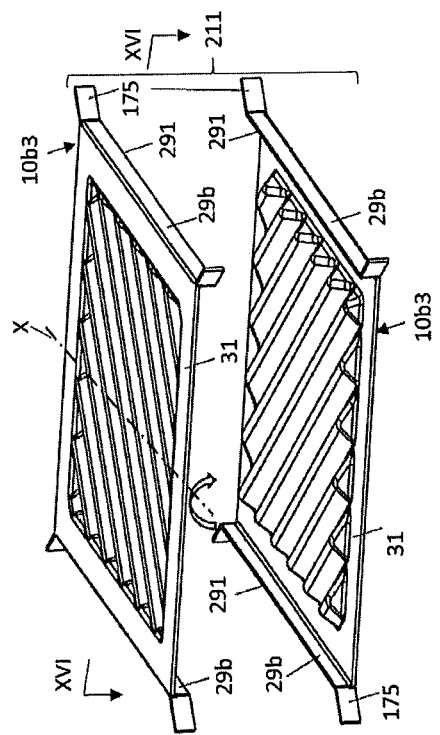

The wall 11 in FIG. 16 is made as shown in FIG. 17, from two identical plates 10b3 with identically bent opposite edges 29b.

Nothing is interposed between the two parallel plates 10b3.

For assembly, one of the two plates is once again rotated through 180° in relation to the other, about the X axis passing through the two opposite unfolded edges, with the edges 29b being face to face. They are subsequently assembled in an airtight manner (typically by welding), by the ends 291 of the folded edges so as to create the duct 9 between the two plates.

If the corrugated sheet form is planned, the corrugations cross from one plate to another, which favourably increases the exchange surface areas.

A stage 270b is created in this manner. In order to create an adjacent stage 270a, all that is needed is to position a double plate 211 and a double plate 11 in parallel coaxially, overlapping each other and subsequently fix in an airtight manner (typically by welding) the two end lengths 290 of the first plate to the two facing opposite edges of the frame 31.

This results in two superposed, crossed ducts, isolated from each other and separated by a "single" wall 11.

If another double plate 11 is placed on top of the double plate 211, oriented as the first and always fixed at the ends 291, the two aforementioned superposed sub-ducts 7a,7b are subsequently created, separated by the double wall 211 containing PCM 13.

An integrated exchanger/store 210 of this kind can therefore in FIG. 8 replace that marked 1, in the insulating jacket 183.

Moreover, for two interesting thermal management systems in particular:
  that of an oil circuit of a vehicle gearbox 213, on the engine 8 (diagram in FIG. 10).
  that of an oil circuit designed to directly lubricate said internal combustion engine 8 (in particular crankshaft 215, camshaft, cylinders 140 . . . ) away from the gearbox (diagram in FIG. 11).

Let us consider in both these cases engine oil 3 adapted to circulate in the oil circuit 6.

As soon as the engine 8 is started, for example after the vehicle has been parked outside for 5-7 hours at 5° C., and whilst the thermal energy storage material 13 of each of the walls 211 of the stages 270a is again assumed to be in liquid phase, for example at 80-100° C., the oil flows into the circuit 6 via the oil pump 217.

At this time, once again corresponding to the point in time T1, the above-mentioned stage b) takes place: the oil enters (as the first fluid 3) through an inlet 169 (FIG. 8) into the stages 270*a* of the heat exchanger 210 (FIGS. 12,13), for example at around 6-8° C. It is heated here by the PCM 13, (exchanges 4*a* FIG. 12, in this case from the PCM 13 to the oil 3 through each wall 11), its being specified that this oil/PCM exchange can also take place in the store 260 of FIG. 9, while access, for water from the circuit 16, to the air/water exchanger 250—which can be an ATF exchanger—is then prohibited, the inlet valve 251 being closed.

With said speed motor running, water also circulates in any case in some ducts and components of the vehicle (see water circuit 16, FIGS. 1,10,11), via the water pump 143.

At this point, the water 5 is still too cold to heat the water. The engine thermostat 145 and the valve 251, then closed, force the water to circulate only in the engine, without therefore any temporary circulation in the radiator 18 or exchanger 250 (or the integrated exchanger/store 210, depending on the selected version). The water consequently increases in temperature more rapidly than the oil. Once it reaches a temperature higher than that of the oil, the inlet valve 251 opens (and at the appropriate time, the thermostat 145 passes it through radiator 18, if it is useful to cool this water so that it preferably does not exceed approximately 90° C.).

As the second fluid 5, the circulating water subsequently flows, through an inlet 169 independent from the first, into the stages 270*b* of the exchanger/store 210 (or into the exchanger 250, on one side of the latter's inner wall 11, in the separated exchanger/store version; FIG. 9).

The oil is subsequently heated by the water (exchanges 4*b* in FIG. 12, in this case from the water 5 to the oil 3, through each wall 11) and possibly by the material 13 on either side of which it flows and which gives it energy through the walls 211, as long as the PCM has not fallen below its change-of-state temperature (on the order of 60-70° C. in the example).

The increase in temperature of the engine continues. The water now flows into the exchanger 210 at 80° C. The oil continues to heat through exchange with this water 5, through the walls 11. The oil now reaches the heat exchanger/store 210 at plus 70° C. It begins to provide heat to the material 13, which is subsequently recharged with thermal energy that will therefore be available for the next operation of the engine, after a further standstill.

Continuing to heat in the engine, the temperature (t1) of the oil 3 now exceeds 90 or even 100° C. and consequently the temperature (t2) of the water 5; said second point in time T2 has arrived. In order to avoid overheating, the oil subsequently transfers thermal energy to the water 5 (walls 11) and to the material 13 (insofar as possible) in the exchanger/store 210 or in the devices 250,260. Stage b) takes place.

With such an embodiment/operation:
- the temperature of the engine oil is raised faster than in the conventional manner (from the point in time T1),
- the increase in temperature of the oil in the engine is restricted at the appropriate moment (from the point in time T2 onwards),
- the thermal energy of the material 13 is easily recovered,
- the interior of the heat exchanger remains at a useful temperature for a longer period of time, since an efficient thermal insulation material 171 has been incorporated in the side walls 165 (or the latter have been lined with the same).

In the above and in particular in all the examples of applications, it will have been noticed that at the second point in time (T2), the temperature (t1) at which the first fluid 3 has been heated (in particular as a result of its circulation in contact with certain rapidly heating components of the engine 8, such as the engine block, cylinders 140 . . . ) being higher than the change-of-state temperature of the PCM material (of at least one of the said) PCM materials 13:
- this phase-change material is loaded with thermal energy via heat exchange with the first fluid 3 in thermal energy storing device 1,210,260,
- and the aforementioned stage b) is performed.

Although the examples have been provided in connection with an internal combustion engine, electric motors for powering electric or hybrid vehicles can be used as a complementary or alternative solution.

The invention claimed is:

1. A method for thermal exchange, wherein:
   a) at a first moment in time, in a thermal energy storing device, at least part of a thermal energy previously accumulated in a form of calories is discharged to an oil, to heat said oil by thermal exchange,
   b) subsequently, at a second later moment in time, when said oil has, during step a), been heated to a temperature higher than a temperature of a water, said water receiving thermal energy by thermal exchange, through a first wall of the thermal energy storing device, said oil which then circulates on an other side of a first wall that prevents said oil and said water from mixing,
   the thermal energy storing device comprising at least one phase-change material, which, at said first point in time, stores at least part of a thermal energy previously accumulated in the form of calories which is discharged to said oil, said thermal energy previously accumulated having been stored during a previous operation of an engine, during a previous thermal exchange with said oil which was, when the previous thermal exchange took place, at a temperature higher than the change-of-state temperature of said at least one phase-change materials, said method being implemented, on a vehicle equipped with a crankshaft and cylinders, and/or a gearbox, arranged in said engine, at an intersection a first oil circuit of the vehicle in which said oil is allowed to circulate and a second water circuit of the vehicle in which said water is allowed to circulate, the first oil circuit passing in the gearbox and/or in contact with the crankshaft and the cylinders.

2. The method according to claim 1, wherein at said second point in time, the temperature to which said oil has been heated being higher than the change-of-state temperature of the at least one phase-change materials:
   said at least one phase-change material is loaded with calories by thermal-exchange with said oil in the thermal energy store,
   and step b) of claim 1 is performed.

3. The method according to claim 1, wherein in the thermal energy storing device, said at least one phase-change material is provided to a second wall that separates, away from the first wall, an inlet flow of said oil into several sub-flows, said sub-flows are circulated along this second wall, said sub-flows:
   during step a), at a temperature below the change-of-state temperature of said at least one phase-change material, and during step b), at a temperature above the temperature of said at least one phase-change material.

4. The method according to claim 1, wherein, through the first wall, said oil and water are placed in direct thermal exchange there between, without interposition of phase-change material.

5. The method according to claim 1, wherein, at the first point in time:
   c) during step a), oil adapted to lubricate said engine and circulating in said first oil circuit of the vehicle arrives in the thermal energy store device at a temperature lower than the change-of-state temperature of said at least one phase-change material, and
   d) there is subsequently no thermal exchange between said oil and water, the circulation of said water in the second water circuit towards said intersection being subsequently interrupted whereas said water circulates elsewhere in the engine where it increases in temperature, in thermal exchange with other elements arranged in said engine.

6. The method according to claim 5, wherein, following step c), step b) is performed, by establishing circulation of said water from the second water circuit towards thermal exchange with said oil when the temperature of said water in the second water circuit is higher than the temperature of said oil arriving for said thermal exchange.

7. The method according to claim 1, wherein said first wall is provided with said at least one phase-change material, said oil is circulated along the first side and the second fluid along the second side of said first wall, simultaneously, from said second point in time.

8. The method according to claim 1, wherein the vehicle comprises a cooling circuit for cooling the engine, said cooling circuit including the second water circuit.

9. The method according to claim 1, wherein a succession of steps a) and b) is carried out in respective thermal exchange stages of the thermal energy storing device, the thermal exchange stages being different from each other and stacked in succession in one direction.

10. A method for conditioning a thermal exchanger having a thermal energy storage capacity and for carrying out thermal energy exchanges therein, wherein:
   the thermal exchange stages according to claim 9 are arranged in a thermally insulating jacket comprising walls surrounding the thermal energy storing device and provided with a thermally insulating material, and
   in said thermal exchange stages, the method according to claim 1 is performed.

* * * * *